(12) United States Patent
Iwata et al.

(10) Patent No.: US 7,839,570 B2
(45) Date of Patent: Nov. 23, 2010

(54) OPTICAL LAYERED BODY, POLARIZER AND IMAGE DISPLAY DEVICE

(75) Inventors: Yukimitsu Iwata, Tokyo (JP); Gen Furui, Tokyo (JP); Takashi Kodama, Tokyo (JP); Mariko Hayashi, Tokyo (JP); Sanae Yoshida, Tokyo (JP); Kiyoshi Itoh, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 421 days.

(21) Appl. No.: 12/017,772

(22) Filed: Jan. 22, 2008

(65) Prior Publication Data

US 2008/0174875 A1    Jul. 24, 2008

(30) Foreign Application Priority Data

Jan. 22, 2007    (JP)    ............................. 2007-012055

(51) Int. Cl.
G02B 5/02    (2006.01)
(52) U.S. Cl. ...................................... 359/599; 359/601
(58) Field of Classification Search . 260/DIG. 15–DIG. 17, DIG. 19; 349/40; 359/599, 601, 609; 428/212, 215; 430/20, 527
See application file for complete search history.

(56) References Cited

U.S. PATENT DOCUMENTS

| 6,383,620 | B1 * | 5/2002 | Aoyama et al. | ............. 428/212 |
|---|---|---|---|---|
| 7,087,351 | B2 * | 8/2006 | Aylward et al. | ............... 430/20 |
| 7,428,025 | B2 * | 9/2008 | Choi | ........................... 349/40 |
| 2006/0057344 | A1 * | 3/2006 | Sakurai et al. | ............. 428/212 |
| 2008/0095997 | A1 * | 4/2008 | Chiang et al. | ............... 428/215 |

FOREIGN PATENT DOCUMENTS

| JP | 2004-069867 | 3/2004 |
|---|---|---|
| JP | 2005-107005 | 4/2005 |
| JP | 2006-095997 | 4/2006 |
| JP | 2006-126808 | 5/2006 |

* cited by examiner

*Primary Examiner*—Frank G Font
(74) *Attorney, Agent, or Firm*—Connolly Bove Lodge & Hutz LLP

(57) ABSTRACT

It is an object of the present invention to provide an improved optical layered body with reduced scintillation, gloss blackness, color effects and interference fringes, while maintaining antistatic and antiglare performance.

The optical layered body comprises, in order, an antistatic layer, an antiglare layer and a low refractive index layer on a light-transmitting substrate, The antistatic layer is a thin resin layer containing antimony-doped tin oxide and a diffusion filler, and having a predetermined surface roughness on its surface.

20 Claims, 4 Drawing Sheets

OPTICAL LAYERED BODY, POLARIZER AND IMAGE DISPLAY DEVICE

TECHNICAL FIELD

The present invention relates to an optical layered body, a polarizer and an image display device.

BACKGROUND ART

An optical layered body including functional layers having various functions is provided on the outermost surfaces of image display devices such as cathode ray tube (CRT) display devices, liquid crystal displays (LCD), plasma displays (PDP), and electroluminescence displays (ELD) (Japanese Kokai Publication 2006-126808, Japanese Kokai Publication 2004-69867, Japanese Kokai Publication 2005-107005, and Japanese Kokai Publication 2006-95997). As such an optical layered body, an optical layered body having a layered structure illustrated in FIG. 1, in which an antistatic layer, an antiglare layer and a low refractive index layer is placed in this order on a substrate, are known. This optical layered body has excellent performance in an antistatic property, an antireflection property, and an antiglare property.

In the antistatic layer in such an optical layered body, antimony-doped tin oxide (ATO) is widely used as an antistatic agent.

There has been a demand in recent years for improvements in display performance in image display devices with a preventing scintillation property to begin with, and with gloss blackness (a black to gray level is favorable, enabling a clear moving picture), i.e. without white muddiness. In order to correspond to this demand, adjustment for achieving a finer surface roughness of an antiglare layer and a constitution for giving internal scattering properties in a coat are further required as long as the surface performance of the antiglare layer being maintained is not deteriorated.

The antiglare layer resulting from diligent efforts generally produces an effect of increasing light transmittance and image sharpness as a film.

However, formation of an optical layered body including such an antiglare layer superior in light transmittance and image sharpness and a low refractive index layer on an antistatic layer containing ATO, brings to light a problem of deteriorating color reproducibility of images, which has not become a problem due to low transparency. This problem of deteriorating color reproducibility is a problem that occurrence of coloring and interference fringes due to the interaction between the antistatic layer containing ATO and other layers upon light irradiation to transmit or reflect the light results in deterioration of the color reproducibility of images and outstanding fringes upon placing the optical layered body on the surface of a display.

SUMMARY OF THE INVENTION

In view of the above state of the art, it is an object of the present invention to provide an optical layered body which improves an preventing scintillation property, gloss blackness, color reproducibility (preventing coloring and interference fringe) while maintaining antistatic performance and an antiglare property.

The present invention provides an optical layered body comprising an antistatic layer, an antiglare layer and a low refractive index layer in this order on a light-transmitting substrate, wherein the antistatic layer is a resin thin layer containing antimony-doped tin oxide and a diffusion filler, and having a surface roughness on its surface.

The diffusion filler is preferably a silica and/or an organic resin bead.

The organic resin bead is preferably at least one species selected from the group consisting of an acrylic bead, a polyethylene bead, a polystyrene bead, a styrene-acrylic copolymer bead, a polycarbonate bead, a polyvinyl chloride bead, a melamine bead, a benzoguanamine-formaldehyde condensate bead, a melamine-formaldehyde condensate bead, a benzoguanamine-melamine-formaldehyde condensate bead and a benzoguanamine-melamine condensate bead.

The diffusion filler preferably has an average particle size of 0.5 to 10.0 μm.

The content of the diffusion filler is preferably 5.0 to 20.0 parts by weight with respect to 100 parts by weight of the solid content of the resin in the antistatic layer.

In the above-mentioned optical layered body, preferably, the surface roughness on the surface of the antistatic layer is formed with the diffusion filler, the antiglare layer has a surface roughness formed with an antiglare agent on its surface, and the surface roughness on the antistatic layer and the surface roughness on the antiglare layer are separately formed, and further, the surface roughness on the surface of the antistatic layer is entirely covered with the antiglare layer.

Preferably, in the optical layered body described above, a surface roughness of the antistatic layer has a mean spacing Sm of the surface roughness of 20 μm or more and 60 μm or less, a mean angle of inclination θa of the surface roughness of 0.5° or more and 3.00 or less, and ten-point mean roughness Rz of the surface roughness of 0.4 μm or more and 1.5 μm or less; and a surface roughness of the antiglare layer has the Sm of 30 μm or more and 200 μm or less, the θa of 0.2° or more and 1.5° or less, and the Rz of 0.3 μm or more and 1.2 μm or less.

The present invention also provides a self-luminous image display device, comprising the optical layered body described above at the outermost surface.

The present invention also provides a polarizer comprising a polarizing element, wherein the polarizer includes the optical layered body described above on a surface of the polarizing element.

The present invention also provides a non-self-luminous image display device, comprising the optical layered body described above or the polarizer described above on the outermost surface.

BRIEF DESCRIPTIONS OF THE DRAWINGS

Figure 1:
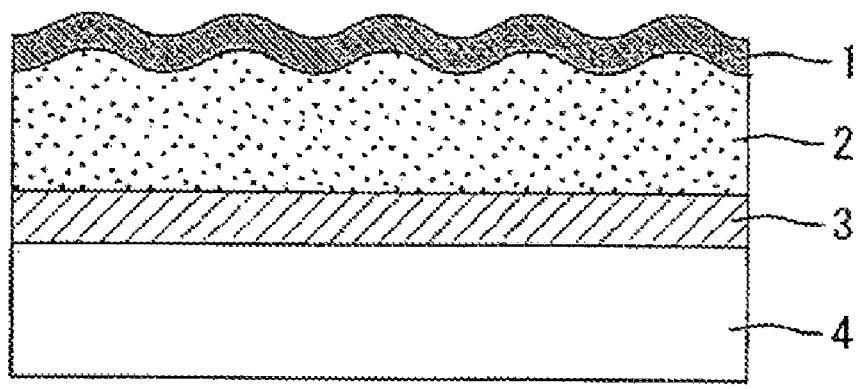
FIG. 1 is an example of a schematic view of an optical layered body of prior art.

EXPLANATION OF THE NUMERICAL SYMBOLS 1 low refractive index layer
2 pantiglare layer
3 antistatic layer
4 light-transmitting substrate
5 nonspherical silica
6, 7 organic fine particles
8 diffusion filler
10 surface glass substrate
11. discharge gas-filled part
12 backside glass substrate
14 light transmitting display
16 light source
18 polarizing element

DETAILED DESCRIPTION OF THE INVENTION

Hereinafter, the present invention will be described in detail.

The present invention relates to an optical layered body comprising an antistatic layer, an antiglare layer and a low refractive index layer in this order on the light-transmitting substrate, wherein the antistatic layer contains antimony-doped tin oxide and a diffusion filler, and has a surface roughness on its surface. Thereby, it has excellent antistatic performance and excellent antiglare property, and improves the preventing scintillation property, gloss blackness and the color reproducibility in being placed in a display.

In the optical layered body of the present invention, the antistatic layer has a surface roughness on its surface. Therefore, even when the antistatic layer contains antimony-doped tin oxide as an antistatic agent, coloring due to light interference does not occur due to interaction between the antistatic layer and the antiglare layer or the low refractive index layer, and the optical layered body which is superior in the antistatic performance and the antiglare property can be given.

It is estimated that the reason why such an effect is obtained is that light interference at the interface of the antistatic layer is suppressed by the surface roughness and consequently coloring due to light interference does not occur.

With respect to the surface roughness in which coloring due to light interference and interference fringe can be prevented, when denoting an mean spacing of the surface roughness of the antistatic layer by Sm, a mean angle of inclination of the surface roughness by $\theta a$, and a ten-point mean roughness of the surface roughness by Rz (definitions of Sm, $\theta a$ and Rz are according to JIS B 06011994), the surface roughness is preferably one in which Sm is 20 μm or more and 60 μm or less,
$\theta a$ is 0.5° or more and 3.0° or less, and
Rz is 0.4 μm or more and 1.5 μm or less.

In addition, measuring conditions of a surface roughness measuring instrument used for determining these Sm, $\theta a$ and Rz are as follows.

Surface roughness measuring instrument (model: SE-3400, manufactured by Kosaka Laboratory Ltd.)

1) Stylus of detection section of surface roughness:

Model: SE 2555N (2 micron standard) manufactured by Kosaka Laboratory Ltd.

(tip radius 2 μm, tip angle: 90°, material: diamond)

2) Measuring conditions of surface roughness measuring instrument

Reference length (cut off value $\lambda c$ of roughness curve) 0.8 mm

Evaluation length (Reference length (cut off value $\lambda c$)×5): 4.0 mm

Measuring speed of stylus: 0.1 mm/s

However, when an appropriate measured value is not obtained under the measuring conditions, it is possible to suitably select the reference length (cut off value $\lambda c$ of roughness curve) from values such as 0.08 mm, 0.25 mm, 2.5 mm, and 8 mm. The appropriate range of the measured values under the respective measuring conditions is according to JIS B 0601 1994.

As a method of forming the surface roughness, a method of forming the surface roughness using a composition containing diffusion fillers can be mentioned.

The antistatic layer contains antimony-doped tin oxide (ATO) as an antistatic agent. The ATO is not particularly limited as long as it has performance capable of being used as a conductive material.

The ATO preferably has an average particle size of 10 to 100 nm. If the average particle size is less than 10 nm, since an agglomerating property is increased, the formation of a uniform antistatic layer may become difficult and stable antistatic performance may not be attained. If the average particle size is more than 100 nm, light transmittance is reduced and optical properties may be adversely affected in forming an optical layered body. More preferably, the average particle size is 20 to 50 nm.

Examples of commercialized products of the ATO, which can be used in the present invention, include an ATO dispersion produced by Mitsubishi Materials Corporation and an ATO dispersion produced by Nippon Pelnox Corporation.

The content of the ATO is preferably 20 to 120 parts by weight with respect to 100 parts by weight of the solid content of a resin in the antistatic layer. If the content is less than 20 parts by weight, adequate antistatic performance may not be obtained. If the content is more than 120 parts by weight, coat quality may become brittle. More preferably, the content is 25 to 80 parts by weight.

The antistatic layer further contains a diffusion filler.

The diffusion filler is particles which are immiscible with a binder resin composing the antistatic layer which can impart the surface roughness to a coat. In the present invention, by containing the diffusion filler, the surface roughness can be formed on the surface of the antistatic layer.

The diffusion filler is preferably silica and/or organic resin beads. By using the silica and/or the organic resin beads, the surface roughness can be readily formed on the surface of the antistatic layer. Further, since the diffusion filler does not have an effect on antistatic performance, it is possible to achieve an excellent antiglare property, excellent color reproducibility and the antistatic performance simultaneously. Among others, the diffusion filler is more preferably insulating organic resin beads in terms of the securement of stable antistatic performance and relative high transparency.

The silica is not particularly limited and silica in any form of crystalline, sol, and gel may be used. Further, as the silica, commercialized products can be used, and examples of commercialized products include nonspherical silica containing ink (produced by Dainichiseika Color & Chemicals Mfg. Co., Ltd.), AEROSIL (Degussa, Ltd.) and Colloidal Silica (produced by Nissan Chemical Industries Co., Ltd.).

The organic resin beads are preferably at least one species selected from the group consisting of acrylic beads (refractive index: 1.49 to 1.53), polyethylene beads (refractive index: 1.50), polystyrene beads (refractive index: 1.60), styrene-acrylic copolymer beads (refractive index: 1.54 to 1.55), polycarbonate beads (refractive index: 1.57), polyvinyl chloride beads (refractive index: 1.60), melamine beads (refractive index: 1.57), benzoguanamine-formaldehyde condensate beads (refractive index: 1.66), melamine-formaldehyde condensate beads (refractive index: 1.66), benzoguanamine-melamine-formaldehyde condensate beads (refractive index: 1.66) and benzoguanamine-melamine condensate beads (refractive index: 1.66). Among others, the organic resin beads are more preferably the styrene-acrylic copolymer beads in terms of the non-occurrence of agglomeration and easy handling when the organic resin beads are mixed with an ATO dispersion.

As the diffusion filler, the silica or the organic resin beads may be used alone or in combination of them.

The diffusion filler preferably has a refractive index different from resins composing the antistatic layer. The reason for this is that interference fringes and coloring due to light interference can be inhibited since an interface having a large difference of refractive index, which causes the occurrence of interference fringes and interference colors, is disturbed by mixing.

The diffusion filler preferably has an average particle size of 0.5 to 10.0 μm. If the average particle size is less than 0.5 μm, an effect of inhibiting interference may be deteriorated and the necessity to add a large amount of the diffusion filler may arise. If the average particle size is more than 10.0 μm, light transmittance is reduced and optical properties may be adversely affected in forming an optical layered body. More preferably, the average particle size is 1.0 to 5.0 μm.

The average particle size is obtained by measuring the diffusion filler in the form of a 5% by weight dispersion of particles in toluene by a laser diffraction scattering particle size distribution analyzer.

The content of the diffusion filler is preferably 5.0 to 20.0 parts by weight with respect to 100 parts by weight of the solid content of the resin in the antistatic layer. If the content is less than 5.0 parts by weight, an effect of inhibiting interference may not be adequately obtained. If the content is more than 20 parts by weight, light transmittance is reduced and optical properties may be adversely affected in forming an optical layered body. More preferably, the above content is 7.0 to 10.0 parts by weight.

As the binder resin which can be used for the antistatic layer, a transparent resin is preferable, and examples of the binder resin include, for example, ionizing radiation-curable resins which are resins to be cured with ultraviolet light or electron beams; a mixture of the ionizing radiation-curable resin and a solvent-drying type resin (a resin, such as a thermoplastic resin, in which a coat is formed by only evaporating a solvent previously added in order to adjust a solid content during the application of the resin); and a thermosetting resin. More preferably, the binder resin is the ionizing radiation-curable resin. In addition, as used herein, the term "resin" includes resin components such as a monomer and an oligomer.

Examples of the ionizing radiation-curable resins include compounds having one or more unsaturated bonds such as compounds having acrylate functional groups. Examples of the compounds having one unsaturated bond include ethyl (meth)acrylate, ethylhexyl (meth)acrylate, styrene, methylstyrene, N-vinylpyrrolidone, and the like. Examples of the compounds having two or more unsaturated bonds include a polyfunctional compound such as polymethylolpropane tri(meth)acrylate, hexanediol di(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate; and reaction products (for example, a poly(meth)acrylate ester of polyhydric alcohol) of the polyfunctional compound with (meth)acrylate, and the like. In addition, as used herein, "(meth)acrylate" refers to methacrylate or acrylate.

Besides the compound, a polyester resin, a polyether resin, an acrylic resin, an epoxy resin, a urethane resin, an alkyd resin, a spiroacetal resin, a polybutadiene resin, and a polythiol-polyen resin, which have an unsaturated double bond, and a relatively low molecular weight, can also be used as the ionizing radiation-curable resin.

The ionizing radiation-curable resin can also be used in combination with the solvent-drying type resin. By using the ionizing radiation-curable resin in combination with the solvent-drying type resin, coat defects of a coated surface can be effectively prevented and thereby a more excellent gloss blackness can be attained. The solvent-drying type resin, which can be used in combination with the ionizing radiation-curable resin, is not particularly limited, and a thermoplastic resin can be generally used.

The thermoplastic resin is not particularly limited, and examples of the thermoplastic resin include styrene resins, (meth)acrylic resins, vinyl acetate resins, vinyl ether resins, halogen-containing resins, alicyclic olefin resins, polycarbonate resins, polyester resins, polyamide resins, cellulose derivatives and silicone resins, rubbers or elastomers, and the like. The thermoplastic resin is preferably non-crystalline and soluble in organic solvents (particularly, common solvent in which a plurality of polymers or curable compounds can be dissolved). Particularly from the viewpoint of a coat forming property, transparency and weather resistance, styrene resins, (meth)acrylic resins, alicyclic olefin resins, polyester resins, and cellulose derivatives (cellulose esters, etc.) are preferable.

In the optical layered body of the present invention, when a material of the light-transmitting substrate is a cellulose resin such as triacetyl cellulose (TAC), preferable specific examples of the thermoplastic resins include cellulose derivatives such as cellulose resins, for example, nitrocellulose, acetyl cellulose, cellulose acetate propionate, ethyl hydroxyethyl cellulose, acetylbutyl cellulose, ethyl cellulose, methyl cellulose, and the like. By using the cellulose resin, it is possible to improve the adhesion of the antistatic layer to the light-transmitting substrate, and transparency. Furthermore, besides the cellulose resins, examples of the thermoplastic resins include vinyl resins such as vinyl acetate and copolymers thereof, vinyl chloride and copolymers thereof, and vinylidene chloride and copolymers thereof, acetal resins such as polyvinyl formal, and polyvinyl butyral, acrylic resins such as an acrylic resin and copolymers thereof, a methacrylic resin and copolymers thereof, polystyrene resins, polyamide resins, polycarbonate resins, and the like.

Examples of the thermosetting resin, which can be used as the binder resin, include a phenol resin, a urea resin, a diallylphthalate resin, a melamine resin, a guanamine resin, an unsaturated polyester resin, a polyurethane resin, an epoxy resin, an aminoalkyd resin, a melamine-urea co-condensation resin, a silicon resin, a polysiloxane resin and the like.

The antistatic layer preferably includes a photopolymerization initiator. Examples of the photopolymerization initiator include acetophenones (for example, trade name "Irgacure 184", 1-hydroxy-cyclohexyl-phenyl-ketone produced by Ciba Specialty Chemicals Inc.), benzophenones, thioxanthones, benzoin, benzoin methyl ether, an aromatic diazonium salt, an aromatic sulfonium salt, an aromatic iodonium salt, a metallocene compound, benzoin sulfonate, and the like. These compounds may be used singly or in combination of two or more species.

The addition amount of the photopolymerization initiator is preferably 0.1 to 10 parts by weight with respect to 100 parts by weight of the solid content of the ionizing radiation-curable resin.

In addition to the components described above, other components may be added to the antistatic layer as required within the bounds of not affecting the effect of the present invention. Examples of the other components include a resin other than the resins described above, an antiglare agent, a surfactant, a coupling agent, a thickening agent, an anticoloring agent, a coloring agent such as pigment or dye, an antifoaming agent, a leveling agent, a flame retarder, an ultraviolet absorber, an infrared absorber, a tackifier, a polymerization inhibitor, an antioxidant, a surface modifier, and the like. With respect to these components, publicly known components generally used in the antistatic layer can be used.

The antistatic layer can be formed by using a composition for forming an antistatic layer obtained by mixing and dispersing the antimony-doped tin oxide, the diffusion filler, the binder resin and other components in a solvent. A paint shaker a beads mill, or the like may be used for mixing and dispersing.

Examples of the solvent include alcohols (examples: methanol, ethanol, isopropanol, butanol and benzyl alcohol), ketones (examples: acetone, methyl ethyl ketone, methyl isobutyl ketone and cyclohexanone), esters (examples: methyl acetate, ethyl acetate, propyl acetate, butyl acetate, methyl formate, ethyl formate, propyl formate and butyl formate), aliphatic hydrocarbons (examples: hexane and cyclohexane), halogenated hydrocarbons (examples: methylene chloride, chloroform and carbon tetrachloride), aromatic hydrocarbons (examples: benzene, toluene, xylene), amides (examples: dimethylformamide, dimethylacetamide and n-methylpyrrolidone), ethers (examples: diethyl ether, dioxane and tetrahydrofuran) and ether alcohols (examples: 1-methoxy-2-propanol), but the solvent is not limited to these compounds. Among others, ketone solvents are preferable in terms of dispersibility, dispersion stability, and safety.

The antistatic layer is preferably formed by applying the composition for forming an antistatic layer onto a light-transmitting substrate, drying the composition as required, and curing the composition by irradiation of active energy rays.

Examples of a method of applying the composition for forming an antistatic layer include application methods such as a roller coating method, a Myer bar coating method, a gravure coating method, and the like.

Examples of the irradiation of active energy rays include irradiation with ultraviolet light or an electron beam. Specific examples of an ultraviolet source include light sources such as an ultra high-pressure mercury lamp, a high-pressure mercury lamp, a low-pressure mercury lamp, a carbon arc lamp, a black light fluorescent lamp and a metal halide lamp. As the wavelength of the ultraviolet light, a wavelength band of 190 to 380 nm can be used. Specific examples of an electron beam source include various electron beam accelerators of a Cockcroft-Walton type, a van de Graaff type a resonance transformer type, an insulating core transformer type, or a linear type, a Dynamitron type and a high-frequency type.

The (dried) layer thickness of the antistatic layer is preferably 100 nm to 2 µm. In the present invention, it is possible to form a surface roughness on the surface by limiting the layer thickness to smaller than the average particle size of the diffusion filler to be added.

If the layer thickness is less than 100 nm, adequate antistatic performance may not be obtained. If the layer thickness is more than 2 µm, light transmittance is reduced and optical properties may be adversely affected in forming an optical layered body. The layer thickness is preferably 150 nm to 1 µm.

Further, the layer thickness can be measured through cross section observation by a laser scanning microscope, SEM, or TEM. For example, in measuring the layer thickness with a laser scanning microscope, a cross section of the antistatic layer is observed in a transmission mode with a confocal laser scanning microscope (Leica TCS-NT: manufactured by Leica Microsystems GmbH: a magnification of 200 to 1000 times) Specifically, a wet objective lens is applied to the confocal laser scanning microscope in order to obtain clear images without halation, and about 2 ml of oil with a refractive index of 1.518 is placed on the cross section of the antistatic layer in order to eliminate an air layer between the objective lens and the cross section of antistatic layer, and then the layer thickness can be observed. Further, a film of the highest projection portion and a film of the lowest depression portion in the surface roughness per one image screen of a microscope, namely two films, are measured on the layer thickness. This measurement is repeated for 5 image screens to yield 10 measured values, and an average value is calculated from these 10 measured values to determine an average layer thickness. In the cross section observation by SEM or TEM, an average value can be determined through the observation of 5 image screens.

The surface resistivity of the antistatic layer is preferably $10^{10}$ Ω/square or less. If the resistivity is not within the above range, adequate antistatic performance may not be exerted. More preferably, the surface resistivity is $10^9$ Ω/square or less.

The optical layered body of the present invention comprises the antistatic layer on a light-transmitting substrate.

The light-transmitting substrate is preferably a substrate having transparency, smoothness and heat resistance, and superior in mechanical strength. Specific examples of materials for forming the above light-transmitting substrate include thermoplastic resins such as polyester (polyethylene terephthalate, polyethylene naphthalate, polybutylene terephthalate, polybutylene naphthalate), triacetyl cellulose (TAC), cellulose diacetate, cellulose acetate butylate, polyester, polyamide, polyimide, polyethersulfone, polysulfone, polypropylene, polymethylpentene, polyvinyl chloride, polyvinyl acetal, polyether ketone, polymethyl methacrylate, polycarbonate and polyurethane. Polyester (polyethylene terephthalate, polyethylene naphthalate) and triacetyl cellulose are preferable.

As the light-transmitting substrate, a film of amorphous olefin polymer (Cyclo-Olefin-Polymer: COP) having an alicyclic structure can also be used. This is a substrate in which norbornene polymers, monocyclic olefin polymers, cyclic conjugated diene polymers, vinyl alicyclic hydrocarbon polymer resins, and the like, are used. Examples of this amorphous olefin polymer include ZEONEX or ZEONOA (norbornene resin) produced by ZEON Corporation, SUMILITE FS-1700 produced by SUMITOMO BAKELITE Co., Ltd., ARTON (modified norbornene resin) produced by JSR Corporation, APEL (cyclic olefin copolymer) produced by Mitsui Chemicals, Inc., TOPAS (cyclic olefin copolymer) produced by Ticona Inc. and OPTOREZ OZ-1000 series (alicyclic acrylic resin) produced by Hitachi Chemical Co., Ltd.). In addition, FV series (low birefringence and low photoelastic coefficient film) produced by Asahi Kasei Chemicals Corporation are also preferable as an alternative substrate of triacetyl cellulose.

As the light-transmitting substrate, the thermoplastic resin is preferably used in a film form, which is rich in flexibility, but plates of these thermoplastic resins may be used or a plate-like body of glass plate may be used in accordance with use pattern requiring curability.

The thickness of the light-transmitting substrate is preferably 20 to 300 µm and more preferably 30 to 200 µm. When the light-transmitting substrate is a plate-like body, the thickness of the light-transmitting substrate may have a thickness of 300 to 5000 µm, exceeding the thickness of the above range. The substrate may have be subjected to application of an anchor agent or a coating material referred to as a primer onto the substrate in advance, in addition to physical treatments such as a corona discharge treatment and an oxidation treatment, in order to improve the adhesive property of the substrate when the antistatic layer is formed on the substrate.

The optical layered body of the present invention comprises the antiglare layer.

The antiglare layer is a layer having a surface roughness on its surface and for inhibiting the reflection of images and reflection due to external light and the deterioration of visibility due to scintillation or the like.

Examples of a method of forming the surface roughness on the surface of the antiglare layer include a method of forming a surface roughness with particles and a method of shaping the surface by embossing.

The antiglare layer can be formed by preparing a resin composition for forming an antiglare layer containing an antiglare agent, a binder resin, a solvent and an optional component. The antiglare layer is formed on the antistatic layer.

Examples of the antiglare agent include fine particles which can form the surface roughness on the surface of the layer, and the shape of the fine particle may be spheric, elliptic, nonspheric or the like and is not particularly limited, and inorganic fine particles and organic fine particles can be used, and a transparent fine particle is preferable. These may be used in singly or in combination thereof. Specific examples of the fine particles composed of organic materials include plastic beads. Examples of the plastic beads include polystyrene beads (refractive index: 1.60), melamine beads (refractive index: 1.57), acrylic beads (refractive index: 1.49 to 1.5:3), acrylic-styrene beads (refractive index: 1.54 to 1.58), benzoguanamine-formaldehyde condensate beads (refractive index: 1.66), melamine-formaldehyde condensate beads (refractive index: 1.66), polycarbonate beads (refractive index: 1.57), polyethylene beads (refractive index: 1.50), benzoguanamine-melamine-formaldehyde condensate beads (refractive index: 1.66), benzoguanamine-melamine condensate beads (refractive index: 1.66), and the like. The plastic bead preferably has a hydrophobic group on its surface, and examples of such plastic beads include polystyrene beads. Examples of the inorganic fine particles include nonspherical silica, inorganic silica beads, and the like. The amount of the fine particles to be added is preferably 1 to 40 parts by weight with respect to 100 parts by weight of a resin composition, and more preferably 1 to 20 parts by weight.

As for the nonspherical silica, silica beads having a particle size of 0.5 to 5 µm, in which dispersibility is good, are preferably used. In order to improve the dispersibility of the nonspherical silica without causing an increase in viscosity of a composition for forming an antiglare layer, it is preferable to use the nonspherical silica which becomes hydrophobic by applying an organic treatment onto the particle surface. There are a method of chemically bonding a compound to the bead surface and a physical method of impregnating voids existing in a composition composing the bead with a compound without chemically bonding a compound to the bead surface for the organic treatment, and either method may be used.

In general, a chemical treatment method, in which an active group of the silica surface such as a hydroxyl group or a silanol group is utilized, is preferably used from the viewpoint of treatment efficiency. As compounds to be subjected to the treatment, silane materials, siloxane materials, or silazane materials, which are highly reactive with the active group, are used. Examples of the compounds include straight alkyl monosubstituted silicone materials such as methyltrichlorosilane, branched alkyl monosubstituted silicone materials, or polysubstituted straight alkyl silicone compounds such as di-n-butyldichlorosilane and ethyldimethylchlorosilane, and polysubstituted branched alkyl silicone compounds. Similarly, monosubstituted or polysubstituted siloxane materials or silazane materials of a straight alkyl group or a branched alkyl group can be effectively used.

A substance having a heteroatom, an unsaturated bonding group, a cyclic bonding group, or an aromatic functional group may be used for an end or an intermediate site of the alkyl group in accordance with a required function.

In these compound, it is possible to attain high affinity for a polymer material whose affinity is low in a state of being untreated since the alkyl group contained exhibits hydrophobicity and therefore the material surface to be treated can be readily converted from hydrophilicity to hydrophobicity.

Further, the antiglare layer preferably contains internal scattering particles. The internal scattering particles can provide internal haze and inhibit scintillation.

Examples of the internal scattering particles include organic particles in which the difference in a refractive index between the organic particles and a binder resin composing the antiglare layer is relatively large, and, include plastic beads such as styrene-acrylic copolymer beads (refractive index: 1.54), melamine beads (refractive index: 1.57), polystyrene beads (refractive index: 1.60), polyvinyl chloride beads (refractive index: 1.60), benzoguanamine-formaldehyde condensate beads (refractive index: 1.66), melamine-formaldehyde condensate beads (refractive index: 1.66), benzoguanamine-melamine-formaldehyde condensate beads (refractive index: 1.66), and benzoguanamine-melamine condensate beads (refractive index: 1.66).

The amount of the internal scattering particles to be added is preferably 1.0 to 20.0 parts by weight with respect to 100 parts by weight of a resin composition, and more preferably, 5.0 to 10.0 parts by weight.

As the particles to be added, particles having a property as an antiglare agent and a property as internal scattering particles together may be used.

As the binder resin, a resin similar to the binder resins which can be used in the antistatic layer can be used.

As the solvent, a solvent similar to the solvents which can be used in the antistatic layer can be used. Among others, it is preferable that the solvent is ketones, esters or aromatic hydrocarbons, and it is particularly preferable to use a ketone solvent and more preferable to use methyl ethyl ketone, methyl isobutyl ketone, or cyclohexanone.

Examples of the optional component include components similar to the component which can be used in the antistatic layer.

The antiglare layer may be formed by preparing the composition for forming an antiglare layer including the above components by an arbitrary method, and forming a layer on the antistatic layer by an arbitrary method.

The layer thickness of the antiglare layer is preferably 1.0 to 8.0 μm, and more preferably 2.0 to 6.0 μm. The layer thickness of the antiglare layer can be obtained by the same measuring method as in the antistatic layer.

With respect to the surface roughness of the antiglare layer, when denoting an mean spacing of the surface roughness by Sm, a mean angle of inclination of the surface roughness by θa, and a ten-point mean roughness of the surface roughness by Rz (definitions of Sm, θa and Rz according to JIS B 0601 1994), the surface roughness is preferably one in which Sm is 30 μm or more and 200 μm or less,
θa is 0.2° or more and 1.5° or less, and
Rz is 0.3 μm or more and 1.2 μm or less.

In addition, measuring conditions of a surface roughness measuring instrument used for determining these Sm, θa and Rz are as follows.

Surface roughness measuring instrument (model: SE-3400, manufactured by Kosaka Laboratory Ltd.)

1) Stylus of detection section of surface roughness:
Model: SE 2555N (2 micron standard) manufactured by Kosaka Laboratory Ltd. (tip radius 2 μm, tip angle: 900, material: diamond)

2) Measuring conditions of surface roughness measuring instrument:
Reference length (cut off value λc of roughness curve) 0.8 mm
Evaluation length (Reference length (cut off value λc)×5): 4.0 mm
Measuring speed of stylus: 0.1 mm/s However, when an appropriate measured value is not obtained under the measuring conditions, it is possible to suitably select the reference length (cut off value λc of roughness curve) from values such as 0.08 mm, 0.25 mm, 2.5 mm, and 8 mm. The appropriate range of the measured values under the respective measuring conditions is according to JIS B 0601 1994.

The optical layered body of the present invention further comprises a low refractive index layer.

The low refractive index layer is formed on the surface of the antiglare layer and has a lower refractive index than that of the antiglare layer. In accordance with a preferable embodiment of the present invention, it is preferable to have a constitution in which the refractive index of the antiglare, layer is 1.5 or more, and the refractive index of the low refractive index layer is less than 1.5 and more preferably 1.45 or less.

The low refractive index layer may be composed of any of 1) a material containing silica or magnesium fluoride, 2) a fluorine material being a low refractive index resin, 3) a fluorine material containing silica or magnesium fluoride, and 4) a thin coat of silica or magnesium fluoride.

The fluorine material is a polymerizable compound containing fluorine atoms at least in a molecule or a polymer thereof. The polymerizable compound is not particularly limited, but a polymerizable compound having a curable and reactive group such as a functional group (ionizing radiation-curable group) to be cured with ionizing radiation or a polar group (heat-curable polar group) to be cured with heat is preferable. Further, compounds having these reactive groups simultaneously together may also be used.

As the polymerizable compounds having an ionizing radiation-curable group containing fluorine atoms, fluorine-containing monomers having an ethylenic unsaturated bond can be widely employed. More specifically, fluoroolefins (for example, fluoroethylene, vinylidene fluoride, tetrafluoroethylene, hexafluoropropylene, perfluorobutadiene, perfluoro-2,2-dimethyl-1,3-dioxole, etc.) can be exemplified. Examples of polymerizable compounds having a (meth) acryloyloxy group include a (meth)acrylate compound having fluorine atoms in a molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth) acrylate, 2-(perfluoroctyl)ethyl (meth)acrylate, 2-(perfluorodecyl)ethyl (meth)acrylate, α-trifluoromethyl methacrylate and α-trifluoroethyl methacrylate; and fluorine-containing polyfunctional (meth)acrylate compounds having a fluoroalkyl group, a fluorocycloalkyl group or a fluoroalkylene group, having 1 to 14 carbon atoms, which has at least three fluorine atoms in a molecule, and at least two (meth) acryloyloxy groups.

Examples of the polymerizable compounds having a heat-curable polar group containing fluorine atoms include 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide. Preferable examples of the heat-curable polar group include groups for forming a hydrogen bond such as a hydroxyl group, a carboxyl group, an amino group and an epoxy group. These groups are superior in not only the adhesion to a coat but also the affinity for an inorganic ultra fine particle such as silica.

Examples of the polymerizable compounds (fluororesin) having the ionizing radiation-curable group and the heat-curable polar group together include partially and fully fluorinated alkyl, alkenyl, or aryl esters of acrylic acid or methacrylic acid, fully or partially fluorinated vinyl ethers, fully or partially fluorinated vinyl esters, fully or partially fluorinated vinyl ketones, and the like.

Examples of the polymer of the polymerizable compound containing fluorine atoms include polymers of a monomer or a mixture of monomers, containing at least one fluorine-containing (meth)acrylate compound of the polymerizable compounds having the ionizing radiation-curable group; copolymers of at least one fluorine-containing (meth)acrylate compound and a (meth)acrylate compound not containing a fluorine atom in a molecule such as methyl (meth)acrylate, ethyl (meth)acrylate, propyl (meth)acrylate, butyl (meth) acrylate and 2-ethylhexyl (meth)acrylate; and monopolymers or copolymers of a fluorine-containing monomer like fluoroethylene, vinylidene fluoride, trifluoroethylene, chlorotrifluoroethylene, 3,3,3-trifluoropropylene, 1,1,2-trichloro-3,3,3-trifluoropropylene and hexafluoropropylene.

Further, silicone-containing vinylidene fluoride copolymer prepared by containing a silicone component in these copolymers can also be used as a polymer of the polymerizable compound. Examples of the silicone component in this case include (poly)dimethylsiloxane, (poly)diethylsiloxane, (poly)diphenylsiloxane, (poly)methylphenylsiloxane, alkyl modified (poly)dimethylsiloxane, azo group-containing (poly)dimethylsiloxane, dimethylsilicone, phenylmethylsilicone, alkyl-aralkyl modified silicone, fluorosilicone, polyether modified silicone, aliphatic acid ester modified silicone, methyl hydrogen silicone, silanol group-containing silicone, alkoxy group-containing silicone, phenol group-containing silicone, methacryl modified silicone, acryl modified silicone, amino modified silicone, carboxylic acid modified silicone, carbinol modified silicone, epoxy modified silicone, mercapto modified silicone, fluorine modified silicone, polyether modified silicone, and the like. Among others, a silicone component having a dimethylsiloxane structure is preferable.

In addition to the compounds described above, compounds obtained by reacting a fluorine-containing compound having at least one isocyanate group in a molecule with a compound having at least one functional group, which reacts with an isocyanate group such as an amino group, a hydroxyl group or a carboxyl group, in a molecule; compounds obtained by reacting fluorine-containing polyol such as fluorine-containing polyether polyols, fluorine-containing alkyl polyols, fluorine-containing polyester polyols and fluorine-containing ε-caprolactone modified polyol with a compound having an isocyanate group; and the like can be used as a fluororesin.

In forming the low refractive index layer, the low refractive index layer can be formed through use of a composition (composition for forming a refractive index layer) including, for example, a raw material component. More specifically, a solution or a dispersion formed by dissolving and dispersing the raw material component (resin, etc.) and the additives (for example, "fine particles having voids" described later, a polymerization initiator, an antistatic agent, an antiglare agent, etc.) as required in a solvent is used as a composition for forming a low refractive index layer, and a coat of the composition is formed, and the coat is cured, and thereby a low refractive index layer can be obtained. In addition, examples of the additives such as the polymerization initiator and the antiglare agent include the additives described in the antistatic layer.

Examples of the solvent include solvents described in the antistatic layer, and methyl isobutyl ketone, cyclohexanone, isopropyl alcohol (IPA), n-butanol, t-butanol, diethyl ketone, PGME, and the like are preferably employed.

A preparation method of the composition may be used as long as the components can be uniformly mixed and the components only have to be mixed according to a publicly known method. For example, the components can be mixed using publicly known apparatus described in a paragraph of formation of the antistatic layer.

The method of forming a coat only has to follow a publicly known method. For example, various methods described in a paragraph of formation of the antistatic layer can be employed.

A method of curing a coat obtained may be appropriately selected in accordance with the content of the composition. For example, when the composition is ultraviolet-curable, the composition may be cured by ultraviolet irradiation to the coat.

In the low refractive index layer, "fine particles having voids" are preferably used as a low refractive index agent. The "fine particles having voids" can reduce the refractive index of the antiglare layer while maintaining layer strength of the antiglare layer. In the present invention, the term "fine particles having voids" means particles having a structure in which the inside of the particle is filled with gas and/or a porous structure including gas is formed, and a characteristic that the refractive index is decreased in inverse proportion to a gas occupancy in the fine particle compared with the particle's own refractive index. In the present invention, a fine particle, in which a nano porous structure can be formed inside the coat and/or in at least a part of the coat surface, based on the configuration, the structure and the agglomeration condition of the fine particles and the state of dispersed particles in a coat, is included. The refractive index of the low refractive index layer using this particle can be adjusted to a refractive index of 1.30 to 1.45.

Examples of inorganic fine particles having voids include silica fine particles prepared by a method described in Japanese Kokai Publication 2001-233611. Silica fine particles prepared by a production method described in Japanese Kokai Publication Hei-7-133105, Japanese Kokai Publication 2002-79616, and Japanese Kokai Publication 2006-106714, may be used. Since the silica fine particle having voids is easily produced and has high particle's own hardness, layer strength thereof is enhanced and it becomes possible to adjust the refractive index to a range of about 1.20 to 1.45 when the particles are mixed with the binder resin to form the low refractive index layer. Particularly, specific preferable examples of organic fine particles having voids include hollow polymer particles prepared by use of a technology disclosed in Japanese Kokai Publication 2002-80503.

Examples of the particle, in which a nano porous structure can be formed inside the coat and/or in at least a part of the coat surface, include a slow-release agent produced for the purpose of increasing a specific surface area, in which various chemical substances is adsorbed on a column for filling and a porous portion of the surface, porous particles used for fixing a catalyst, and dispersed substances or agglomerated substances of hollow particles for the purpose of incorporating in a heat insulating material or a low dielectric material in addition to the silica particles. Specifically, it is possible to select and use the particles within the range of the preferable particle size of the present invention from agglomerated substances of porous silica particles of commercially available Nipsil or Nipgel (both trade name) produced by Nihon silica kogyo corporation and colloidal silica UP series (trade name), having a structure in which silica particles are linked with one another in a chain form, produced by Nissan Chemical Industries, Ltd.

An average particle size of the "fine particles having voids" is 5 nm or more and 300 nm or less, and preferably, a lower limit is 8 nm and an upper limit is 100 nm, more preferably, a lower limit is 10 nm and an upper limit is 80 nm. It becomes possible to impart excellent transparency to the antiglare layer when the average particle size of the particles falls within this range. In addition, the average particle size is measured by a dynamic light-scattering method. An amount of the "fine particles having voids" is usually about 0.1 to 500 parts by weight with respect to 100 parts by weight of a matrix resin in the low refractive index layer, and preferably about 10 to 200 parts by weight.

In forming the low refractive index layer, it is preferable to set the viscosity of the composition for forming a low refractive index layer in a range of 0.5 to 5 cps (25° C.) where a preferable application property is attained, and preferably 0.7 to 3 cps (25° C.). An excellent antireflection coat of visible light can be realized, a uniform thin coat can be formed without producing irregularity of application, and a low refractive index layer having particularly excellent adhesion to the substrate can be formed.

Means for curing a resin may be the same one as described in a paragraph of the antiglare layer. When heating means is used for curing the resin, preferably, a heat-polymerization initiator, which generates, for example, radicals by heat to initiate the polymerization of a polymerizable compound, is added to a fluororesin composition.

A coat thickness (nm) $d_A$ of the low refractive index layer preferably satisfies the following equation (I):

$$d_A = m\lambda/(4n_A) \quad \text{(I)},$$

wherein $n_A$ represents a refractive index of the low refractive index layer, m represents a positive odd, and preferably 1, λ is a wavelength, and preferably values from 480 nm to 580 nm.

Further, in the present invention, it is preferable from the viewpoint of reducing a reflection factor that the low refractive index layer satisfies the following equation (II)

$$120 < n_A d_A < 145 \quad \text{(II)}.$$

The optical layered body of the present invention has the antistatic layer, the antiglare layer and the low refractive index layer on the light-transmitting substrate, but it may include an antifouling layer, a high refractive index layer or a medium refractive index layer as an arbitrary layer as required in addition to the layers described above. An antifouling agent, a high refractive index agent, a medium refractive index agent, an antistatic agent or a resin, usually used, is added to prepare compositions, and using these compositions, the antifouling layer, high refractive index layer and medium refractive index layer may be formed by a publicly known method.

The optical layered body of the present invention preferably has a surface roughness on its surface. With respect to the surface roughness, when denoting an mean spacing between surface roughness of the outermost layer of the optical layered body by Sm, a mean angle of inclination of the surface roughness by $\theta a$, and a ten-point mean roughness of the surface roughness by Rz (definitions of Sm, $\theta a$ and Rz according to JIS B 0601 1994), the surface roughness is preferably one in which Sm is 30 μm or more and 200 μm or less,
$\theta a$ is 0.2° or more and 1.5° or less, and
Rz is 0.3 μm or more and 1.2 μm or less.

In addition, measuring conditions of a surface roughness measuring instrument used for determining these Sm, $\theta a$ and Rz are the same as measuring conditions of a surface roughness measuring instrument for the antiglare layer as mentioned above.

A visible light transmittance of the optical layered body of the present invention is preferably 90% or more. If this transmittance is less than 90%, color reproducibility may be impaired in the case where the optical layered body is placed on the display surface. More preferably, the visible light transmittance is 95% or more.

A surface haze value of the optical layered body is preferably 10% or less. If the haze value is more than 10%, color reproducibility may be impaired in the case where the optical layered body is placed on the display surface. More preferably, the haze value is 0.2 to 5%. The haze value was obtained by measurement by a reflection and transmittance meter HM-150 (manufactured by Murakami Color Research Laboratory).

The internal haze value of the optical layered body is preferably 0.1 to 70%, and more preferably 3 to 40%. When the internal haze value is within the above range, an effect of improving the preventing scintillation property is obtained in the case where the optical layered body of the present invention is used in an LCD or the like.

The surface haze value and internal haze value were obtained by a method described later. That is, a resin solution is prepared by diluting a resin (including resin components such as monomer and oligomer) such as pentaerythritol triacrylate with toluene so as to be 60% in solid content, and the obtained resin solution is applied onto the surface roughness on the outermost surface of the optical layered body with a wire bar in such a way that a dried film thickness is 8 μm. Thereby, the surface roughness on the outermost surface is buried and the outermost layer becomes a smooth layer. However, when a composition composing the outermost layer contains a leveling agent and therefore a recoat agent is repelled and hard to become wet, it is better that the optical layered body is subjected to hydrophilic treatment in advance by a saponification treatment (an optical layered body is immersed in a 2 mol/l NaOH (or KOH) solution at 55° C. for 3 minutes, and then the optical layered body is washed with water, and is wiped thoroughly with a kim-wipe, and then is dried in an oven at 50° C. for 1 minute). This optical layered body, the surface of which is smooth, becomes a state of not having haze due to the surface roughness but having only internal haze. This haze can be determined as an internal haze. Further, by subtracting the internal haze from haze of the original optical layered body (overall haze), haze only due to the surface roughness (surface haze) is determined.

Figure 2:
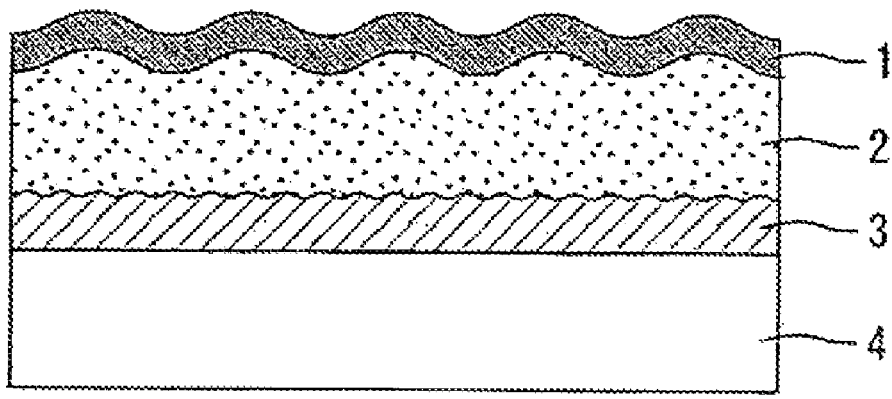
FIG. 2 is an example of a schematic view of an optical layered body of the present invention.

An embodiment of the optical layered body of the present invention will be described by use of drawings. FIG. 2 shows an optical layered body comprising a low refractive index layer 1, an antiglare layer 2, an antistatic layer 3 and a light-transmitting substrate 4 vertically in this order. The optical layered body of the present invention may be composed of arbitrary layers in accordance with the objects, and it is not limited to the embodiment described above.

Figure 3:
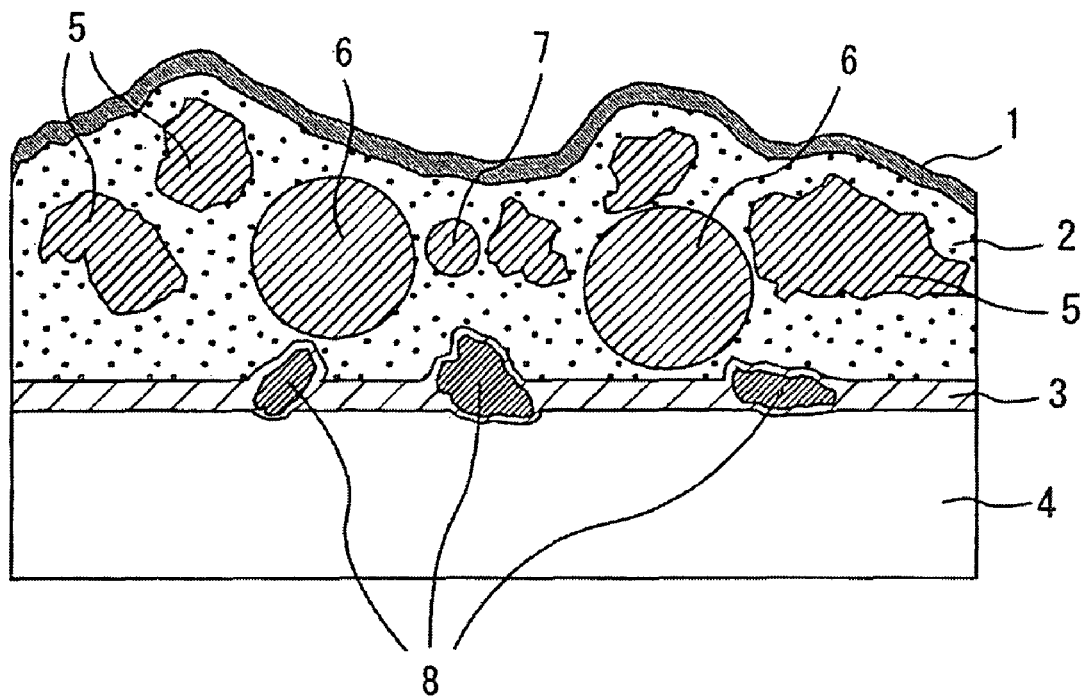
FIG. 3 is an embodiment of partially enlarged cross-sectional view of an optical layered body of the present invention.
Figure 4:
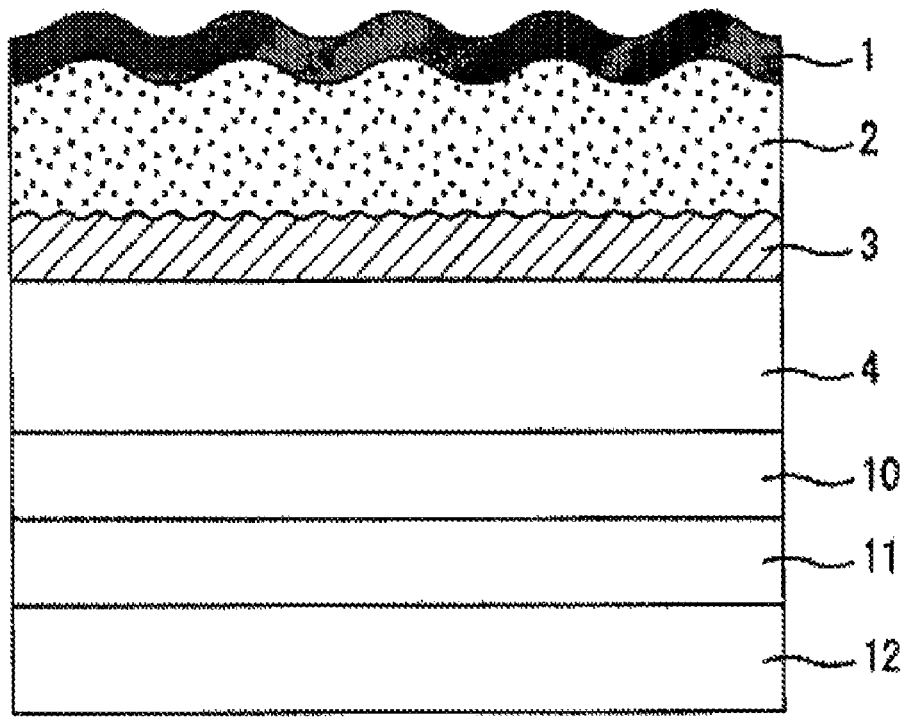
FIG. 4 illustrates a PDP that is one example of a self-luminous image display device employing an optical layered body of the present invention.
Figure 5:
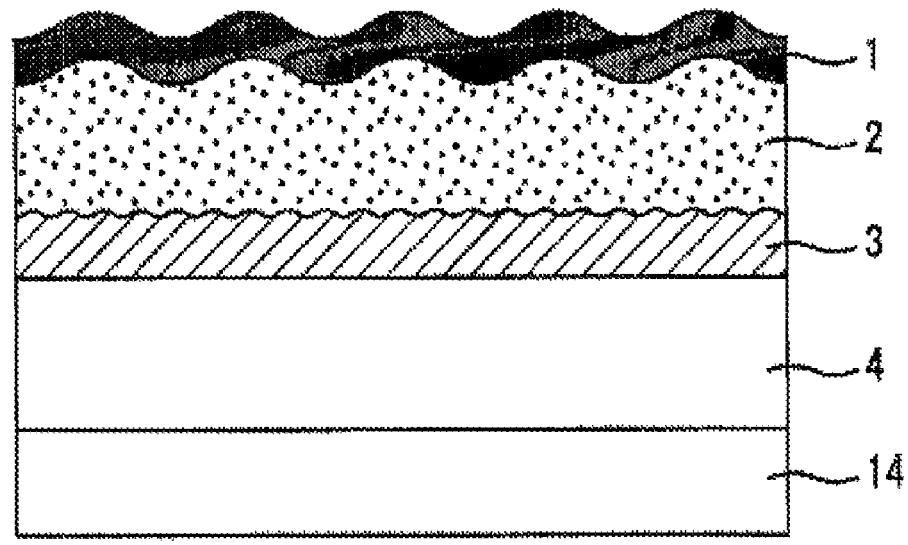
FIG. 5 illustrates a non-self-luminous image display device employing an optical layered body of the present invention.
Figure 5:
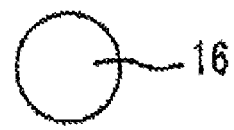
Figure 6:
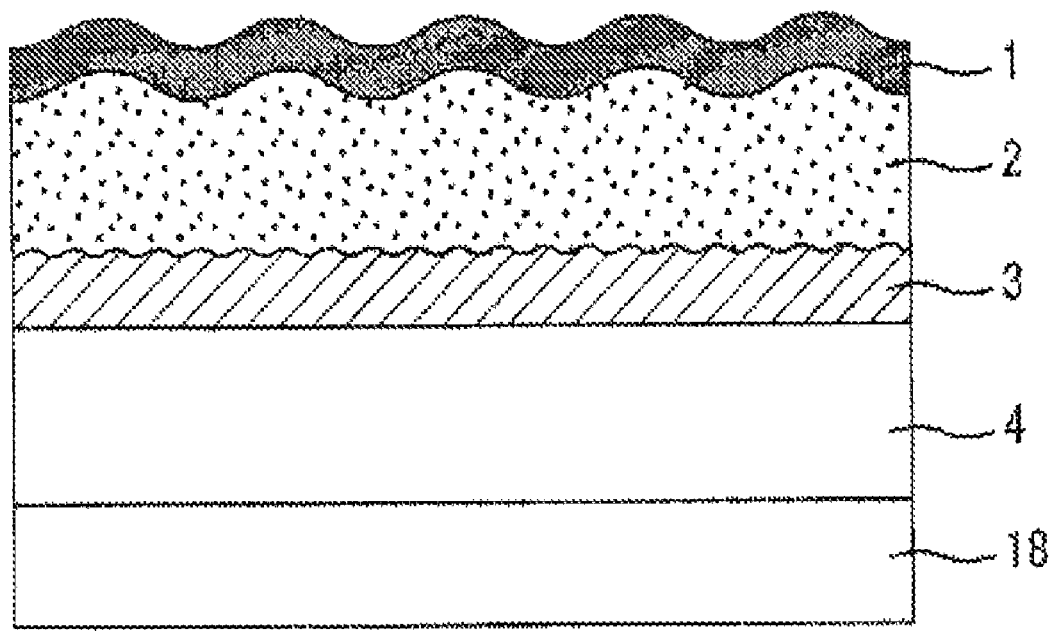
FIG. 6 illustrates a polarizing element employing an optical layered body of the present invention.

As shown in FIG. 3, in the optical layered body of the present invention, the surface roughness on the surface of the antistatic layer 3 is preferably formed with the diffusion filler 8, the antiglare layer 2 preferably has a surface roughness on its surface formed with an antiglare agent (e.g., nonspherical silica 5, organic particles 6 and 7) on its surface, and the surface roughness on the antistatic layer 3 and the surface roughness on the antiglare layer 2 are preferably separately formed.

The surface roughness of the antistatic layer 3 is preferably entirely covered with the antiglare layer 2. In the optical layered body according to such an embodiment of the present invention, the surface roughness of the antistatic layer 3 and the surface roughness of the antiglare layer 2 are separately formed. The surface roughness of the antiglare layer 2, which is an upper layer, is not influenced by the surface roughness of the antistatic layer 3. Therefore, it is possible to obtain an optical layered body superior in a preventing scintillation property, gloss blackness, and color reproducibility, with an antistatic property and an antiglare property maintained.

FIG. 3 is a partially enlarged cross-sectional view of one embodiment of an optical layered body of the present invention.

In FIG. 3, although a portion where no diffusion filler of the antistatic layer is present has a flat shape, this portion needs not to be perfectly flat as long as the effects of the present invention are not impaired, and a microscopic surface roughness may be present thereon.

The optical layered body of the present invention can be formed into a polarizer by providing the optical layered body on the side opposite to the side where the antistatic layer in the optical layered body exists on the surface of a polarizing element. The polarizer like this also constitutes the present invention.

The polarizing element is not particularly limited, and as the polarizing element, for example, a polyvinyl alcohol film, a polyvinyl formal film, a polyvinyl acetal film or an ethylene-vinyl acetate copolymer saponified film, which is dyed with iodine or the like and stretched, can be used. In laminating the polarizing element and the optical layered body of the present invention, preferably, the light-transmitting substrate is subjected to a saponification treatment. The adhesive property between the polarizing element and the optical layered body becomes good by the saponification treatment, and thus an antistatic effect can be attained.

The present invention also provides an image display device including the optical layered body or the polarizer at the outermost surfaces. The image display device may be a non-self-luminous image display device such as LCD, or may be a self-luminous image display device such as PDP, FED, ELD (organic EL, inorganic EL) and CRT.

The LCD, which is a typical example of the non-self-luminous type, includes a light-transmitting display and a light source apparatus to irradiate the light-transmitting display from the backside. When the image display device of the present invention is an LCD, the optical layered body of the present invention or the polarizer of the present invention is formed on the surface of this light-transmitting display.

When the present invention provides a liquid crystal display device having the optical layered body, a light source of the light source apparatus irradiates from the side on which the light-transmitting substrate exists of the optical layered body. In addition, in the SNT type liquid crystal display device, a retardation plate may be inserted between a liquid crystal display element and the polarizer. An adhesive layer may be provided between the respective layers of this liquid crystal display device as required.

The PDP, which is the self-luminous image display device, includes a surface glass substrate and a backside glass substrate which is located at a position opposite to the surface glass substrate with a discharge gas filled between these substrates. When the image display device of the present invention is a PDP, the PDP includes the optical layered body described above on the surface of the surface glass substrate or a front plate (glass substrate or film substrate) thereof.

The self-luminous image display device may be an ELD apparatus in which luminous substances of zinc sulfide or diamines materials to emit light through the application of a voltage are deposited on a glass substrate by vapor deposition and display is performed by controlling a voltage to be applied to the substrate, or image display devices such as CRT, which converts electric signals to light to generate visible images. In this case, the image display device includes the optical layered body described above on the outermost surface of each of the display devices or on the surface a front plate thereof.

The optical layered body of the present invention can be used for displays such as televisions, computers, and word processors in any case. Particularly, it can be suitably used for the surfaces of displays for high-resolution images such as CRTs, liquid crystal panels, PDPs and ELDs.

EFFECT OF THE INVENTION

Since the optical layered body of the present invention has the constitution described above, it is superior in antistatic performance, an antiglare property and color reproducibility. Therefore, the optical layered body of the present invention can be suitably applied to cathode ray tube (CRT) display devices, liquid crystal displays (LCD), plasma displays (PDP), and electroluminescence displays (ELD).

BEST MODE FOR CARRYING OUT THE INVENTION

Hereinafter, the present invention will be described in more detail by way of examples, but the present invention is not to be construed to limit to these examples. "Part (s)" and "%" refer to "part(s) by weight" and "% by weight", unless otherwise specified.

EXAMPLE 1

Preparation of Composition for Forming Antistatic Layer

A composition was prepared by adequately mixing the following: materials. This composition was filtrated with a polypropylene filter having a pore size of 30 μm to prepare a composition for forming an antistatic layer.

Antistatic Agent:

| | |
|---|---|
| Antimony doped tin oxide dispersion (produced by Nippon Pelnox Corporation, a methyl ethyl ketone dispersion) solid content | 60 parts by weight |
| Diffusion filler (silica particle): | |
| Nonspherical silica (average particle size: 2.0 μm) | 8.5 parts by weight |
| Ultra violet curable resin: | |
| Hexanediol diacrylate (HDDA) | 15 parts by weight |
| Pentaerythritol triacrylate (PETA) | 85 parts by weight |
| Photopolymerization initiator: | |
| Irgacure 184 (produced by Ciba Specialty Chemicals Inc.) | 5.0 parts by weight |
| Solvent: | |
| Cyclohexanone | 30 parts by weight |
| Methyl isobutyl ketone | 70 parts by weight |

Preparation of Composition for Forming Antiglare Layer

A composition was prepared by adequately mixing the following materials. This composition was filtrated with a polypropylene filter having a pore size of 30 μm to prepare a composition for forming an antiglare layer.

Ultra Violet Curable Resin:

| | |
|---|---|
| Pentaerythritol triacrylate (PETA) | 98.8 parts by weight |
| Cellulose acetate propionate (molecular weight 50000) | 1.2 parts by weight |
| Photopolymerization initiator: | |
| Irgacure 184 (produced by Ciba Specialty Chemicals Inc.) | 5.0 parts by weight |
| Fine particles (inorganic beads): | |
| Nonspherical silica A (average particle size: 2.0 μm) | 1.00 parts by weight |
| Nonspherical silica B (average particle size: 1.2 μm) | 5.00 part by weight |
| Fine particles (organic beads): | |
| Styrene beads (average particle size: 3.5 μm) | 6.00 parts by weight |
| Benzoguanamine-melamine condensate beads (average particle size: 1.8 μm) | 3.00 part by weight |
| Silicon leveling agent | 0.19 part by weight |
| Solvent: | |
| Toluene | 80 parts by weight |
| Methyl isobutyl ketone | 20 parts by weight |

Preparation of Composition for Forming Low Refractive Index Layer

A composition was prepared by adequately mixing the following materials. This composition was filtrated with a polypropylene filter having a pore size of 30 μm to prepare a composition for forming a low refractive index layer.

| Ultra violet curable resin: | |
| --- | --- |
| Pentaerythritol triacrylate (PETA) (refractive index: 1.51) | 100 parts by weight |
| Treated silica sol-containing solution (silica sol solid content; 20% by weight, solvent; methylisobutyl ketone) | 15 parts by weight |
| Photopolymerization initiator: | |
| Irgacure 369 (produced by Ciba Specialty Chemicals Inc.) | 3.5 parts by weight |
| Modified silicone oil (X22164E; produced by Shin-Etsu Chemical Co., Ltd.) | 1.0 part by weight |
| Solvent: | |
| Methyl isobutyl ketone | 70 parts by weight |
| Propylene glycol monomethyl ether acetate | 30 parts by weight |

Formation of Antistatic Layer and Antiglare Layer

Using a triacetyl cellulose film (TD 80U, produced by FUJIFILM Corporation) having a thickness of 80 μm as a light-transmitting substrate, the composition for forming an antistatic layer was applied onto the substrate with a wire wound rod for coating (a Mayer bar) #4, and the applied composition was heated to dry for 30 seconds in an oven at 70° C., and ultraviolet light was irradiated to the resulting coat at an exposure of 27 mJ/cm² under nitrogen purge (oxygen content: 200 ppm or less) to form an antistatic layer having a coat thickness of about 250 nm. Subsequently, the composition for forming an antiglare layer was applied onto the antistatic layer with a Mayer bar #10, and the applied composition was heated to dry for 30 seconds in an oven at 70° C. to evaporate the solvent fraction, and then a coat was cured by irradiating ultraviolet light to the coat at an exposure of 15 mJ/cm² under nitrogen purge (oxygen content: 200 ppm or less) to form an optical layered body having an antiglare property. The total thickness of the antiglare layer in this case was about 3.7 μm.

Formation of Low Refractive Index Layer

Next, the composition for forming a low refractive index layer was applied onto the surface of the antiglare layer with a wire wound rod for coating (a Mayer bar) #4, and the applied composition was air-dried for about 1 minute and then heated to dry for 1 minute in an oven at 50° C. to evaporate the solvent fraction, and then a coat was cured by irradiating ultraviolet light to the coat at an exposure of 147 mJ/cm² under nitrogen purge (oxygen content: 200 ppm or less) to form an optical layered body having an antiglare property, in which a low refractive index layer was layered. Here, under illumination for inspection, the resulting optical layered body was visually observed, and consequently it was confirmed that interference fringes were not formed and coloring due to interference did not occur.

EXAMPLE 2

An optical layered body having an antiglare property, which comprises a light-transmitting substrate, an antistatic layer, an antiglare layer and a low refractive index layer, was formed in the same manner as in Example 1 except for using a mixture of diffusion filler formed by adequately mixing the following compositions in place of the diffusion filler (nonspherical silica) in the composition for forming an antistatic layer in Example 1.

The resulting optical layered body was similarly visually observed under illumination for inspection, and consequently it was confirmed that interference fringes were not formed and coloring due to interference did not occur.

Diffusion Filler (Silica Particles, Organic Resin Beads):
  Nonspherical silica (average particle size: 2.0 μm)
  3.5 parts by weight
  Styrene-acrylic copolymer beads (average particle size: 3.5 μm) 5.0 parts by weight Comparative Example 1

An optical layered body having an antiglare property, which comprises a light-transmitting substrate, an antistatic layer, an antiglare layer and a low refractive index layer, was formed in the same manner as in Example 1 except for not adding the diffusion filler (nonspherical silica) in the composition for forming an antistatic layer in Example 1. The resulting optical layered body was similarly visually observed under illumination for inspection, and consequently interference fringes were identified.

Reference Example 1

An optical layered body having an antiglare property, which comprises a light-transmitting substrate, an antistatic layer, an antiglare layer and a low refractive index layer, was formed in the same manner as in Example 1 except for adding the diffusion filler (nonspherical silica) 22 parts by weight in the composition for forming an antistatic layer in Example 1. The resulting optical layered body was similarly visually observed under illumination for inspection, and consequently it was confirmed that interference fringes were not formed and coloring due to interference did not occur.

Also in the optical layered body in each of Examples 1 and 2, Comparative Example 1, and Reference Example 1, upon forming the antistatic layer, with respect to the surface of the antistatic layer, a mean spacing Sm of the surface roughness, a mean angle of inclination θa of the surface roughness, and a ten-point mean roughness Rz of the surface roughness were measured by the method defined in the present description, that is, the method according to JIS B0601 1994, so that a surface roughness was evaluated. The Sm, θa, and Rz of the outermost surface were also measured in the optical layered body in Example 1. Table 1 shows the results of these.

Also, in the optical layered body with no interference fringe formed in each of Examples 1 and 2, and Reference Example 1, a measurement of the total light transmittance and a prevention test of dust adhesion were carried out by the following methods. Table 1 shows the results.

<Total Light Transmittance>

The total light transmittance (%) of the optical layered body was measured in conformity to JIS K-7361 with a Haze Meter (produced by MURAKAMI COLOR RESEARCH LABORATORY, item number: HM-150).

<Prevention Test of Dust Adhesion>

The side face of the light-transmitting substrate of the optical layered body was attached to the side face of the polarizing element of the polarizer having a one-side protective film, with TAC attached only to one side of the polarizer (the other side remained the polarizing element), by using a transparent adhesive material (an acryl-type adhesive agent for an optical film, DA-1000, produced by Hitachi Chemical Co., Ltd.) to produce a polarizer. The evaluation was carried out by the following method: assuming that an optical layered body was formed above the polarizing element; rubbing the face of a low refractive index layer 20 times in a reciprocating manner with a polyester cloth; bringing the rubbed face close to cigarette ash; and evaluating a prevention property of dust adhesion with the following criteria.

Evaluation Criteria evaluation good: δ10 ash adhered, and a prevention property of dust adhesion was exerted.

evaluation poor: much ash adhered, and a prevention property of dust adhesion was not exerted.

TABLE 1

|  |  | Example 1 | | Example 2 | Comparative example 1 | Reference example 1 |
| --- | --- | --- | --- | --- | --- | --- |
|  |  | The surface of antisitatic layer | The outermost surface of the optical layered body |  |  |  |
| Surface roughness | Rz(μm) | 1.054 | 0.812 | 1.244 | 0.221 | 2.35 |
|  | θa(°) | 2.13 | 1.117 | 2.289 | 0.167 | 3.512 |
|  | Sm(μm) | 43.8 | 60.6 | 41.8 | 147.9 | 107.7 |
| Total light transmittance (%) | | 92.6 | | 92.4 | — | 87.2 |
| Prevention test of dust adhesion | | good | | good | — | poor |

INDUSTRIAL APPLICABILITY

The optical layered body of the present invention can be suitably applied to cathode ray tube (CRT) display devices, liquid crystal displays (LCD), plasma displays (PDP), electroluminescence displays (ELD), or the like.

The invention claimed is:

1. An optical layered body comprising an antistatic layer, an antiglare layer and a low refractive index layer in an order on a light-transmitting substrate,
    wherein said antistatic layer is a resin thin layer containing antimony-doped tin oxide and a diffusion filler, wherein the diffusion filler is a silica and/or an organic resin bead, and
    wherein the low refractive index layer has a lower refractive index than that of the antiglare layer.

2. The optical layered body according to claim 1,
    wherein the organic resin bead is at least one species selected from the group consisting of an acrylic bead, a polyethylene bead, a polystyrene bead, a styrene-acrylic copolymer bead, a polycarbonate bead, a polyvinyl chloride bead, a melamine bead, a benzoguanamine-formaldehyde condensate bead, a melamine-formaldehyde condensate bead, a benzoguanamine-melamine-formaldehyde condensate bead and a benzoguanamine-melamine condensate bead.

3. The optical layered body according to claim 1, wherein the diffusion filler has an average particle size of 0.5 to 10.0μm.

4. The optical layered body according to claim 1, wherein the content of the diffusion filler is 5.0 to 20.0 parts by weight with respect to 100 parts by weight of the solid content of the resin in the antistatic layer.

5. The optical layered body according to claim 1, wherein a surface roughness on the surface of the antistatic layer is formed with the diffusion filler, the antiglare layer has a surface roughness formed with an antiglare agent on its surface, and the surface roughness on said antistatic layer and the surface roughness on said antiglare layer are separately formed, and
    further, the surface roughness on the surface of said antistatic layer is entirely covered with said antiglare layer.

6. The optical layered body according to claim 5,
    wherein a surface roughness of the antistatic layer has a mean spacing Sm of the surface roughness of 20μm or more and 60μm or less, a mean angle of inclination θa of the surface roughness of 0.5° or more and 3.0° or less, and ten-point mean roughness Rz of the surface roughness of 0.4μm or more and 1.5μm or less; and
    a surface roughness of the antiglare layer has the Sm of 30μm or more and 200μm or less, the θa of 0.2° or more and 1.5° or less, and the Rz of 0.3μm or more and 1.2μm or less.

7. A self-luminous image display device, comprising the optical layered body according to claim 1, at the outermost surface.

8. A polarizer comprising a polarizing element,
    wherein the polarizer includes the optical layered body according to claim 1, on a surface of the polarizing element.

9. A non-self-luminous image display device, comprising the optical layered body according to claim 1, on the outermost surface.

10. The optical layered body according to claim 2, wherein the diffusion filler has an average particle size of 0.5 to 10.0μm.

11. The optical layered body according to claim 10, wherein the content of the diffusion filler is 5.0 to 20.0 parts by weight with respect to 100 parts by weight of the solid content of the resin in the antistatic layer.

12. The optical layered body according to claim 2, wherein the content of the diffusion filler is 5.0 to 20.0 parts by weight with respect to 100 parts by weight of the solid content of the resin in the antistatic layer.

13. The optical layered body according to claim 3, wherein the content of the diffusion filler is 5.0 to 20.0 parts by weight with respect to 100 parts by weight of the solid content of the resin in the antistatic layer.

14. The optical layered body according to claim 10,
    wherein a surface roughness on the surface of the antistatic layer is formed with the diffusion filler, the antiglare layer has a surface roughness formed with an antiglare agent on its surface, and the surface roughness on said antistatic layer and the surface roughness on said antiglare layer are separately formed, and
    further, the surface roughness on the surface of said antistatic layer is entirely covered with said antiglare layer.

15. The optical layered body according to claim 2,
    wherein a surface roughness on the surface of the antistatic layer is formed with the diffusion filler, the antiglare layer has a surface roughness formed with an antiglare agent on its surface, and the surface roughness on said antistatic layer and the surface roughness on said antiglare layer are separately formed, and further, the surface roughness on the surface of said antistatic layer is entirely covered with said antiglare layer.

16. The optical layered body according to claim 3, wherein a surface roughness on the surface of the antistatic layer is formed with the diffusion filler, the antiglare layer has a surface roughness formed with an antiglare agent on its surface, and the surface roughness on said antistatic layer and the surface roughness on said antiglare layer are separately formed, and further, the surface roughness on the surface of said antistatic layer is entirely covered with said antiglare layer.

17. The optical layered body according to claim 4, wherein a surface roughness on the surface of the antistatic layer is formed with the diffusion filler, the antiglare layer has a surface roughness formed with an antiglare agent on its surface, and the surface roughness on said antistatic layer and the surface roughness on said antiglare layer are separately formed, and further, the surface roughness on the surface of said antistatic layer is entirely covered with said antiglare layer.

18. The optical layered body according to claim 15, wherein a surface roughness of the antistatic layer has a mean spacing Sm of the surface roughness of 20μm or more and 60μm or less, a mean angle of inclination θa of the surface roughness of 0.5° or more and 3.0° or less, and ten-point mean roughness Rz of the surface roughness of 0.4μm or more and 1.5μm or less; and a surface roughness of the antiglare layer has the Sm of 30μm or more and 200μm or less, the θa of 0.2° or more and 1.5° or less, and the Rz of 0.3μm or more and 1.2μm or less.

19. The optical layered body according to claim 16, wherein a surface roughness of the antistatic layer has a mean spacing Sm of the surface roughness of 20μm or more and 60μm or less, a mean angle of inclination θa of the surface roughness of 0.5° or more and 3.0° or less, and ten-point mean roughness Rz of the surface roughness of 0.4μm or more and 1.5μm or less; and a surface roughness of the antiglare layer has the Sm of 30μm or more and 200μm or less, the θa of 0.2° or more and 1.5° or less, and the Rz of 0.3μm or more and 1.2μm or less.

20. The optical layered body according to claim 17, wherein a surface roughness of the antistatic layer has a mean spacing Sm of the surface roughness of 20μm or more and 60μm or less, a mean angle of inclination θa of the surface roughness of 0.5° or more and 3.0° or less, and ten-point mean roughness Rz of the surface roughness of 0.4μm or more and 1.5μm or less; and a surface roughness of the antiglare layer has the Sm of 30μm or more and 200μm or less, the θa of 0.2° or more and 1.5° or less, and the Rz of 0.3μm or more and 1.2μm or less.

* * * * *